Figure 1:
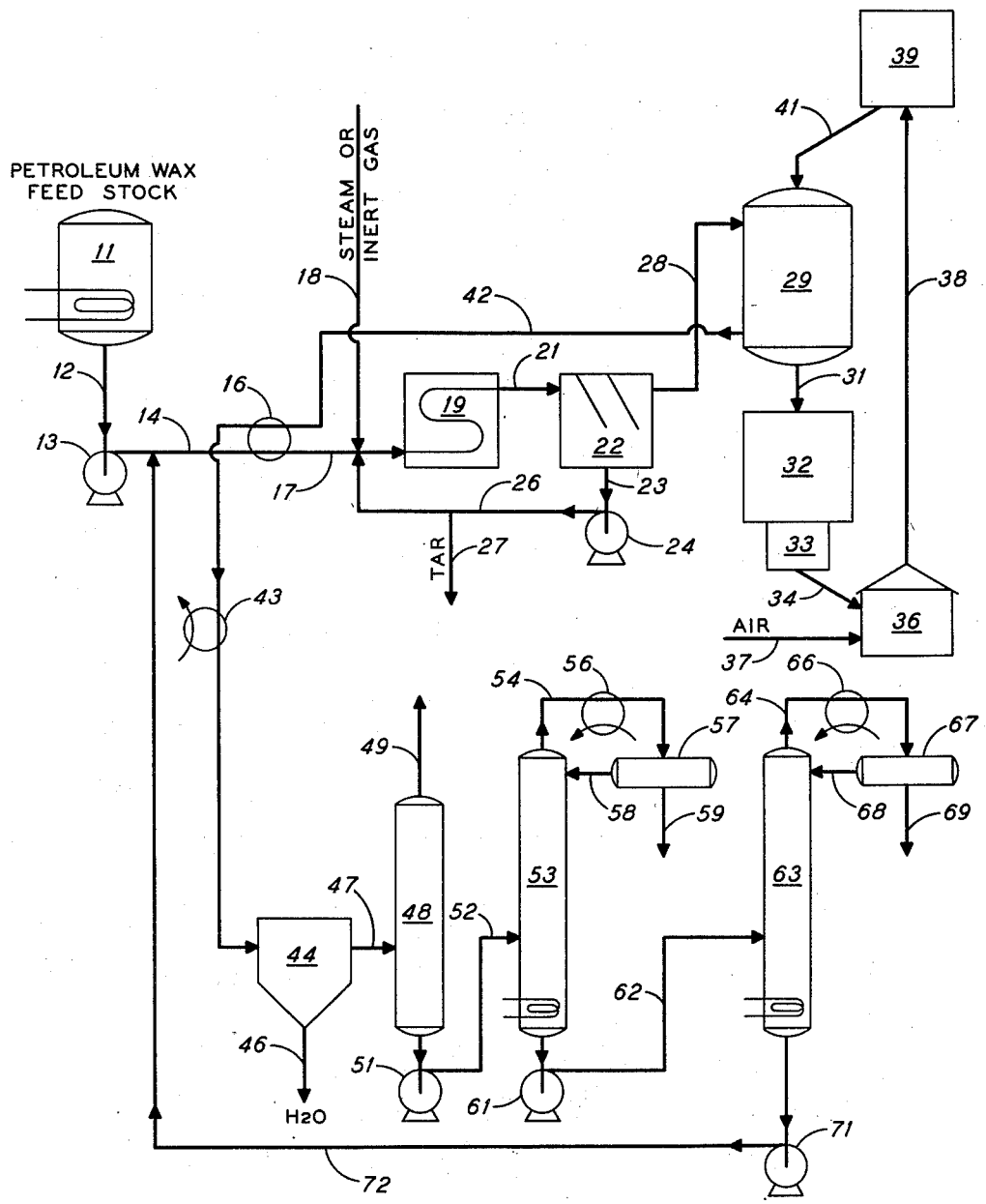

INVENTOR
OLIVER K. MOORE

Oct. 23, 1956     O. K. MOORE     2,768,225
PRODUCTION OF LONG-CHAIN OLEFINS
Filed July 2, 1952     2 Sheets-Sheet 2
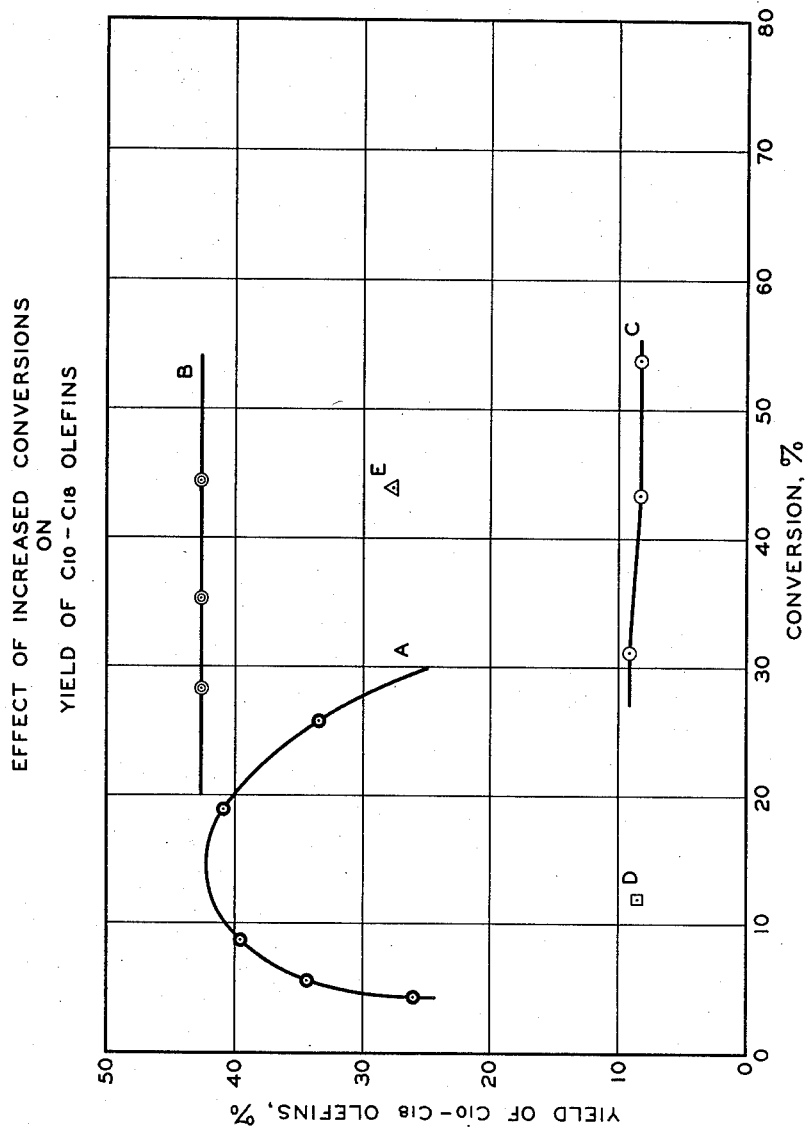
INVENTOR
*OLIVER K. MOORE*
BY
ATTORNEY
AGENT United States Patent Office 2,768,225
Patented Oct. 23, 1956

2,768,225

PRODUCTION OF LONG-CHAIN OLEFINS

Oliver K. Moore, Richmond, Calif., assignor to California Research Corporation, San Francisco, Calif., a corporation of Delaware Application July 2, 1952, Serial No. 296,829

3 Claims. (Cl. 260—683)

The present invention relates to a novel process for the production of valuable long-chain olefins. More particularly, the invention relates to the catalytic conversion of petroleum wax to long-chain olefins having an average of from 10 to 18 carbon atoms per molecule.

Long-chain olefins of medium molecular weight, that is, those having molecular weights equivalent to from about 10 to about 18 carbon atoms per molecule, are in great demand because of their use in the manufacture of synthetic detergents, lubricants, surface-active germicides, viscosity index improvers, corrosion inhibitors, and various other types of chemicals.

Olefins, for the foregoing uses, have heretofore been obtained from several different sources via various methods, as for example, the dehydration of long-chain aliphatic alcohols obtained from natural oils, halogenation and dehydrohalogenation of hydrocarbon fractions such as kerosene distillate, polymerization of low molecular weight olefins such as ethylene, propylene, butylenes, etc., as well as many others. Such sources and methods are, in general, expensive. Furthermore, their total output is not sufficient to meet the present day demands for these important, long-chain, medium molecular weight olefins.

It has also been known heretofore that the heavier, high molecular weight petroleum hydrocarbons may be converted to lower molecular weight hydrocarbons by thermal and catalytic cracking processes. In such processes, as in the manufacture of motor gasoline and other fuels, a constant effort is made to achieve high conversions for economic reasons. Generally, these cracking processes are difficult to control and high conversions necessarily involve a considerable amount of fragmentation in the hydrocarbon chains. The low molecular weight hydrocarbons resulting from such fragmentation ordinarily must be disposed of, usually as heating fuel or waste gas, or subjected to further processing, such as polymerization or alkylation, to transform them into useful hydrocarbons.

In accordance with the present invention, it has been found that long-chain olefins having molecular weights equivalent to from about 10 to about 18 carbon atoms per molecule, which are of an essentially straight-chain structure, can be produced by contacting petroleum wax with activated alumina in a reaction zone at mild cracking conditions. These olefins are obtained directly from the cracking phase and may be purified by conventional procedures such as fractional distillation and the like. The process, by employing alumina catalyst under mild cracking conditions, is readily controllable, and at the high conversions of wax to olefin which are obtained, excessive decomposition of the hydrocarbons to undesirable low molecular weight materials is avoided.

As an illustration of one embodiment of the invention, a flow diagram of the present process is shown in Figure 1 of the drawings. In the diagram the wax feed stock is transferred from storage 11 through line 12 by pump 13 into line 14. At this point recycle from the final distillation step of the process comprising partially cracked petroleum wax having molecular weights in excess of the desired $C_{10}$ to $C_{18}$ range may be introduced. The mixture of feed stock and recycle are then passed through heat exchanger 16. Following the heat exchanger, the partially preheated feed stock and recycle mixture is combined in line 17 with non-vaporized feed recycled from separator 22 prior to introduction to preheater 19. If desired, preheated steam or inert gas may also be added to the charge at this point.

The combined feed and gases are passed through preheater 19 at a relatively high velocity. From the preheater the vaporized feed and gases are passed through line 21 to separator 22 where any entrained liquid consisting of non-vaporized petroleum wax feed is separated by baffles. The separted non-vaporized feed is returned via line 23, pump 24, and line 26, to feed line 17 as already mentioned for reintroduction to preheater 19. Tarry materials which build up in the recycle stream from the separator due to their low volatility may be bled from line 26 via line 27. With semi-refined petroleum wax feed stocks the bleed stream from line 27 may not be required. The small amount of tarry materials formed from such charge stocks is merely deposited on the catalyst and burned off during regeneration with little or no disadvantage to the process.

From separator 22 the vaporized feed is conducted through line 28 to reactor 29 where catalytic cracking over activated alumina catalyst is accomplished. A moving bed system is described in the diagram for handling the catalyst, but other catalyst systems such as the fixed bed and fluid flow systems may also be used. The spent catalyst travels by gravity flow from reactor 29 via line 31 to regenerator kiln 32 where carbonaceous material deposited on the catalyst is burned off. The catalyst is then cooled in cooler 33, the excess heat being used to generate steam, supply heat to the preheater, and for other such purposes. The cooled, regenerated catalyst then flows by gravity through line 34 to a receiver 36. From receiver 36 air or mechanical means may be used to lift the catalyst via line 38 to a combination storage bin and separator shown as vessel 39. The catalyst is then returned to reactor 29 via line 41 at the desired rate.

The cracked products in vaporized form are withdrawn from reactor 29 via line 42 through heat exchanger 16 mentioned above. The vapors are then further cooled in cooler 43 and passed to separator 44 where any condensed water present is separated and drawn off by line 46. From the separator the cracked products are conveyed via line 47 to stripper 48. In the stripper the lighter cracked products which are normally gaseous at atmospheric pressure, such as hydrogen, methane, ethane, ethylene, propane, propylene, butane, butylenes, and the like, are stripped from the heavier cracked products and removed through line 49. The gases thus separated are rich in propene, butene, etc. and are useful in the preparation of polymers.

From the stripper, the heavier cracked products are withdrawn as bottoms and conveyed by pump 51 through line 52 to fractionator 53. In the fractionator an overhead stream containing the $C_5$ to $C_9$ hydrocarbons is withdrawn in vaporized form. The vapors are condensed in condenser 56 and collected in condensate drum 57. Reflux to fractionator 53 from the condensate drum is maintained through line 58 and the balance of the $C_5$ to $C_9$ products withdrawn via line 59 for further treatment and utilization in other refinery processes such as the production of motor gasoline, etc.

The bottoms from fractionator 53 are conveyed via pump 61 and line 62 to fractionator 63 which is conveniently operated at reduced pressure to avoid the necessity for deleterious high temperatures. Olefin-rich hydrocarbons in the $C_{10}$ to $C_{18}$ range are distilled overhead through line 64. They are condensed in condenser 66 and collected in condensate drum 67 from which reflux is returned to the fractionator via line 68. The olefin-rich hydrocarbons which constitute the primary product of the process are withdrawn via line 69 and may be used as such without further treatment in any of the various applications such as production of synthetic detergents, lubricants, and the like, mentioned heretofore.

The bottoms from fractionator 63 comprising hydrocarbons heavier than those boiling in the $C_{10}$ to $C_{18}$ range are withdrawn via pump 71 through line 72 to line 14 where they are recycled to the cracking process together with fresh wax feed stocks as previously mentioned.

The petroleum wax may be any wax produced from petroleum. It may be a paraffin, crystalline type, or it may be of a branched-chain microcrystalline type. The waxes may be refined, substantially pure paraffin waxes having melting points from about 105 to 165° F. or refined microcrystalline waxes such as high melting point waxes having melting points from about 165 to 200° F. They may, on the other hand, be unrefined wax fractions containing oil of similar boiling range in amounts up to about 30% by weight of the oil and wax composition. For example, slack wax which is obtained in the process of dewaxing petroleum stocks may be distilled into various cuts. The waxy distillates and slack wax bottoms thus obtained may then be deoiled as part of their refinement into various grades of waxes characterized by a variety of melting points within the aforementioned ranges. However, a particular advantage of the process according to this invention lies in the fact that substantially the same high yields of $C_{10}$ to $C_{18}$ olefins may be obtained by it from a low grade, non-deoiled wax fraction such as slack wax bottoms as may be obtained from the corresponding refined wax.

The activated alumina catalyst which, according to the present discovery, has the remarkable property of cracking the petroleum wax directly to long-chain olefins of the desired structure and chain length, is well known in the art of refining petroleum hydrocarbons and, as such, should require no detailed description here. It is a typical commercial grade of activated alumina and may be used in the form of powder, granules, beads or pellets.

Generally described, the activated alumina catalyst as employed in the process of this invention is a highly adsorbent, completely dehydrated aluminum oxide ($Al_2O_3$) in its gamma crystalline form. Suitable catalysts of the foregoing type may be prepared by several means which are also known to the art. Such means include the ignition or calcination of aluminum hydroxide or of naturally occurring aluminum minerals such as bauxite. Alumina hydrates, namely, the monohydrate, the dihydrate and the trihydrate, may also be activated by treatment with inorganic or organic acids such as sulfuric acid or glacial acetic acid to form a suitable activated alumina catalyst for use in the present process.

The cracking conditions utilized in the process of this invention do not involve extremely high temperatures, great pressures or prolonged contact times and are, therefore, termed "conventional cracking conditions" as distinguished from extreme cracking conditions sometimes employed in the production of motor fuels from heavy petroleum hydrocarbons. The temperatures generally do not exceed 1100° F. and, preferably, lie within the range of from about 850 to 1050° F. Higher temperatures of about 1200° F. or more may be suitably employed, however, under conditions involving shorter than ordinary contact times, and the like. Atmospheric, subatmospheric or superatmospheric pressures which are less than the vapor pressure of the petroleum wax at the particular temperature employed are suitable. Ordinarily, the pressures will not exceed 5 atmospheres, while approximately atmospheric pressures are preferred for convenience of operation. The contact times are of short duration, usually not more than 20 seconds and, preferably, in the range of from about 5 to 15 seconds. The feed rates will vary from about 1.10 to 1.25 grams of feed per cubic centimeter of furnace per hour. The cracking is carried out, preferably, in an inert, oxygen-free atmosphere to avoid rapid decomposition and the hazards of combustion. Inert gases such as steam and nitrogen may be conveniently employed as diluents.

The cracked products obtained in the present process are substantially olefinic, straight-chain hydrocarbons of from 10 to 18 carbon atoms in length. They are readily purified by various means such as fractional distillation, and the like, which are well known in the art of refining hydrocarbons. Due to the high degree of conversion of petroleum wax to straight-chain olefins of $C_{10}$ to $C_{18}$ carbons obtained by the process according to this invention, it is found that a substantially pure fraction of $C_{10}$ to $C_{18}$ olefins can be conveniently separated by fractional distillation, thereby avoiding the disadvantages of the more complex and expensive types of purification.

The present process is adapted to continuous type operations. The unconverted heavy hydrocarbons obtained after the foregoing purification procedures are recycled to the reaction zone along with petroleum wax charge stock and subjected to further cracking. It is thus possible to convert a substantial proportion of the petroleum wax charge to the desired $C_{10}$ to $C_{18}$ olefins.

The process of the invention, likewise, may be adapted to any of the various known types of catalytic cracking methods. Briefly mentioned, these include: "Fixed bed" conversion process in which hydrocarbon to be cracked is passed into one reaction zone containing catalyst and, periodically, upon the catalyst being spent in this zone, the hydrocarbon feed is transferred to another reaction zone containing catalyst while the catalyst in the first zone undergoes regeneration with hot flue gas, etc.; "moving bed" conversion processes in which a single reaction zone is employed with fresh catalyst being continuously added and spent catalyst continuously withdrawn to a regeneration zone; "fluid catalyst" conversion processes in which the catalyst in powdered form is suspended in the charge and moves with it through the reaction zone, after which it is separated from the cracked products, regenerated, and remixed in suspension with additional charge.

In further illustration of the process of the invention, laboratory runs were made in a cracking furnace consisting of a stainless steel tube of 1 inch inside diameter and about 25 inches in length. This furnace was equipped with heating coils, a thermocouple at its center, and then insulated. Feed pumps and lines were steam jacketed and nitrogen was supplied as a diluent gas. The cracked products from the furnace were passed into a distilling flask equipped with a water-cooled reflux condenser. Non-condensed products were passed through a drying tower and a cold trap immersed in acetone and solid carbon dioxide. The tail gas was measured by a wet test meter.

Representative petroleum waxes of the types mentioned above were cracked using a number of catalysts for comparison. Non-catalytic thermal cracking runs were also made. The paraffin wax employed was a deoiled wax having a melting point of about 150 to 155° F. by the American melting point method. The slack wax bottoms was a 30% residuum from the distillation of slack wax and contained about 20% by weight oil. The microcrystalline wax was obtained by deoiling the slack wax bottoms with benzene and methyl ethyl ketone at 70° F. and had a melting point of about 170° F. The average molecular weights of the foregoing waxes was estimated to be between 500 and 700 on the basis of their melting points and refractive indices. The catalysts tested besides the activated alumina were a co-precipitated alumina and silica type in bead form commonly known as Thermofor catalytic cracking catalyst, a butadiene catalyst consisting of 18% $Cr_2O_3$ on $Al_2O_3$ and a hydrated magnesium silicate-calcium silicate catalyst specifically intended for the cracking of paraffin wax to long-chain olefins (see U. S. Patent No. 2,441,962). Atmospheric pressures were employed and temperature, contact times, and feed rates were as disclosed in the table of data below.

quality of product. This makes the process a very desirable one since the long-chain olefins produced may be employed in the manufacture of synthetic detergents, lubricants, etc. without the need for further expensive treatments or purification procedures. The fact that the process utilizes starting materials which are readily available in large amounts at low cost also make it highly attractive from a practical point of view.

TABLE

*Cracking of petroleum wax to $C_{10}$-$C_{18}$ olefins*

| Run No. | 1 | 2 | 3 | 4 | 5 | 6 | 7 | 8 | 9 |
|---|---|---|---|---|---|---|---|---|---|
| Petroleum Wax | Paraffin | Paraffin | Paraffin | Paraffin | Paraffin | Slack Wax Bottoms | Microcrystalline | Paraffin | Paraffin |
| Catalyst | None | None | None | None | None | None | None | Alumina-Silica | Alumina-Silica |
| Temperature, °F | 1,000 | 1,000 | 940 | 940 | 940 | 1,000 | 1,000 | 800 | 800 |
| Contact Time, Seconds | 25.0 | 47.0 | 26.3 | 44.7 | 89.2 | 15.6 | 14.4 | 16.6 | 7.9 |
| Feed Rate, Grams/cc. furnace/hr | 0.50 | 0.28 | 0.50 | 0.26 | 0.15 | 1.23 | 1.22 | 0.63 | 1.26 |
| Cracked Products: Wt. Percent of Charge: | | | | | | | | | |
| Tail Gas ($C_1$-$C_4$ and $H_2$) Percent | 5.9 | 8.0 | 1.3 | 1.6 | 2.1 | 3.4 | 2.4 | 5.5 | 4.8 |
| $CO_2$ Trap Condensate ($C_3$-$C_5$) Percent | 3.1 | 6.2 | 0.9 | 1.0 | 1.1 | 3.8 | 3.2 | 17.5 | 14.5 |
| Light Distillate ($C_5$-$C_9$) Percent | 1.8 | 2.6 | 0.9 | 0.7 | 1.6 | 2.6 | 2.4 | 13.9 | 10.0 |
| $C_{10}$-$C_{18}$ Product, Percent | 8.2 | 9.2 | 1.4 | 2.2 | 4.1 | 11.4 | 8.7 | 11.7 | 11.8 |
| Bromine No | 81 | 97 | 70 | 70 | 70 | 74 | 72 | 30 | 24 |
| Coke, Wt. Percent | | | | | | | | 5.2 | 2.2 |
| Conversion, Wt. Percent | 19.0 | 26.0 | 4.5 | 5.5 | 8.9 | 21.5 | 17.2 | 53.8 | 43.3 |
| Yield, Wt. Percent $C_{10}$-$C_{18}$ Olefins (based on feed converted) | 41.0 | 33.6 | 26.7 | 34.4 | 39.6 | 47.7 | 44.5 | 8.1 | 8.2 |

| Run No. | 10 | 11 | 12 | 13 | 14 | 15 | 16 |
|---|---|---|---|---|---|---|---|
| Petroleum Wax | Paraffin | Paraffin | Paraffin | Microcrystalline | Microcrystalline | Microcrystalline | Slack Wax Bottoms |
| Catalyst | Alumina-Silica | Chromia-Alumina | $CaMgSiO_3$ | Activated Alumina | Activated Alumina | Activated Alumina | Activated Alumina |
| Temperature, °F | 800 | 750 | 845 | 1,000 | 875 | 875 | 950 |
| Contact Time, Seconds | 13.2 | 10.6 | 29.6 | 9.7 | 11.3 | 8.1 | 11.4 |
| Feed Rate, Grams/cc. furnace/hr | 1.20 | 1.01 | 0.78 | 1.23 | 1.22 | 1.20 | 1.24 |
| Cracked Products: Wt. Percent of Charge: | | | | | | | |
| Tail Gas ($C_1$-$C_4$ and $H_2$) Percent | 1.5 | 2.2 | 1.5 | 5.4 | 1.7 | 2.9 | 4.8 |
| $CO_2$ Trap Condensate ($C_3$-$C_5$) Percent | 6.8 | 0.2 | 4.4 | 6.2 | 2.8 | 4.2 | 9.1 |
| Light Distillate ($C_5$-$C_9$) Percent | 9.5 | 0.5 | 16.1 | 7.9 | 3.5 | 4.0 | 10.0 |
| $C_{10}$-$C_{18}$ Product, Percent | 11.7 | 1.1 | 18.8 | 24.4 | 17.7 | 22.0 | 34.9 |
| Bromine No | 19 | | 53 | 64 | 56 | 56 | 57 |
| Coke, Wt. Percent | 1.7 | 8.1 | 3.1 | 0.7 | 2.7 | 2.2 | 2.2 |
| Conversion, Wt. Percent | 31.2 | 12.0 | 43.9 | 44.6 | 28.4 | 35.3 | 61.0 |
| Yield, Wt. Percent $C_{10}$-$C_{18}$ Olefins (based on feed converted) | 8.6 | 8.5 | 27.8 | 42.7 | 42.4 | 42.4 | 40.0 |

In the above table it is apparent from a consideration of Runs 1, 6, 7 and 16 that the particular type of petroleum wax employed has little effect on the yields in either thermal or catalytic cracking.

The data from the cracking runs as tabulated above demonstrates conclusively that as the conditions are altered to increase the conversions, there is no loss in yield of olefins when alumina catalyst is employed as distinguished from non-catalytic cracking. In graphic illustration of this phenomena the curves in Figure 2 of the drawings were plotted from the test data. Reference to these curves shows that as the conversion rate is increased in non-catalytic cracking (curve A), the yield of olefins falls off sharply. In catalytic cracking with alumina, on the other hand, it is seen from curve B that the conversions may be stepped up without any appreciable drop in yield of olefins. Curve C and points D and E show that yields per conversion in catalytic cracking with other catalysts, namely, alumina-silica, chromia-alumina and calcium-magnesium-silicates, are much inferior to the yields with alumina.

In view of the foregoing data and discussion, it is readily apparent that the present process of cracking petroleum wax at mild cracking conditions in the presence of activated alumina has many real and substantial advantages which distinguish it over previously known processes. The conversions of high molecular weight petroleum wax to valuable long-chain olefins may be maintained at a high rate without any appreciable lowering of

I claim:
1. A wax cracking process for producing long-chain olefins which comprises contacting a petroleum wax with a catalyst consisting essentially of activated gamma alumina in a reaction zone maintained at conventional cracking conditions but at a temperature not in excess of 1100° F., and separating an olefinic fraction having an average molecular weight equivalent to from about 10 to about 18 carbon atoms.

2. The process of claim 1 wherein the wax is selected from the group consisting of paraffin wax, slack wax and microcrystalline wax.

3. The process of claim 1 wherein the petroleum wax contains up to about 30% by weight of oil having approximately the same boiling range as the wax, the contact being carried out at a temperature in the range of about 850 to about 1050° F. for a time from about 5 to 15 seconds, and a pressure of less than about 5 atmospheres.

References Cited in the file of this patent
UNITED STATES PATENTS

| | | |
|---|---|---|
| 2,086,287 | Towne | July 6, 1937 |
| 2,096,769 | Tropsch | Oct. 26, 1937 |
| 2,184,235 | Groll et al. | Dec. 19, 1939 |
| 2,331,292 | Archibald et al. | Oct. 12, 1943 |
| 2,441,962 | Gilbert et al. | May 25, 1948 |
| 2,547,380 | Fleck | Apr. 3, 1951 |